June 22, 1926.

F. J. DONAHUE

REFLECTING BOX

Filed Feb. 28, 1923

1,590,011

Inventor
Frank J. Donahue

By Philip A. H. Ferrill
Attorney

Patented June 22, 1926.

1,590,011

UNITED STATES PATENT OFFICE.

FRANK J. DONAHUE, OF OMAHA, NEBRASKA.

REFLECTING BOX.

Application filed February 28, 1923. Serial No. 621,962.

The object of the invention is to provide a combined means of determining direction, indicating weather and registering temperature; designed principally for tourists when traveling in a part of the country with which they are not well acquainted; this refers especially to the compass; the barometer incating the weather for an advance period of time, thus safeguarding the tourist as to weather conditions ahead. The thermometer registers the temperature constantly which is a great convenience and satisfaction to the tourists or others using this combination device. This device of course is not confined to the use of tourists, but may be used by all who have need for such a registering device. The invention relates to reflecting devices and has for its object to provide a box disposed on the instrument board of an automobile and having its upper side disposed with an angularly disposed mirror, in which is reflected a barometer, a thermometer and a compass disposed in the box, thereby allowing the operator of the automobile to easily ascertain the reading of the instruments without moving from his position at the steering wheel.

A further object is to provide the forward side of the chamber of the box with a vertically disposed mirror, in which mirror the instruments are reflected and in turn reflected in the angularly disposed mirror.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
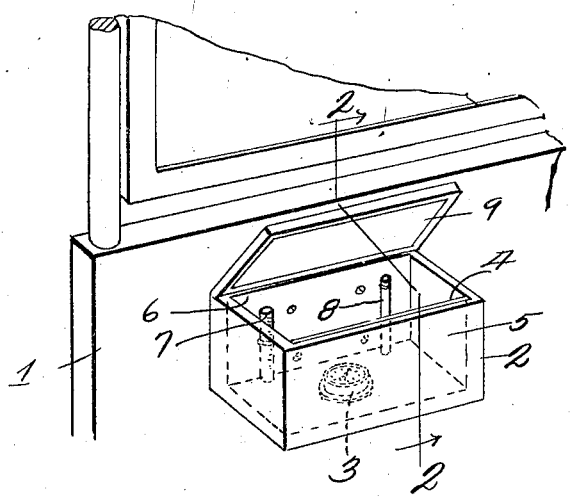
Figure 1 is a perspective view of the reflecting box, showing the same attached to an instrument board.
Figures 2, 3:
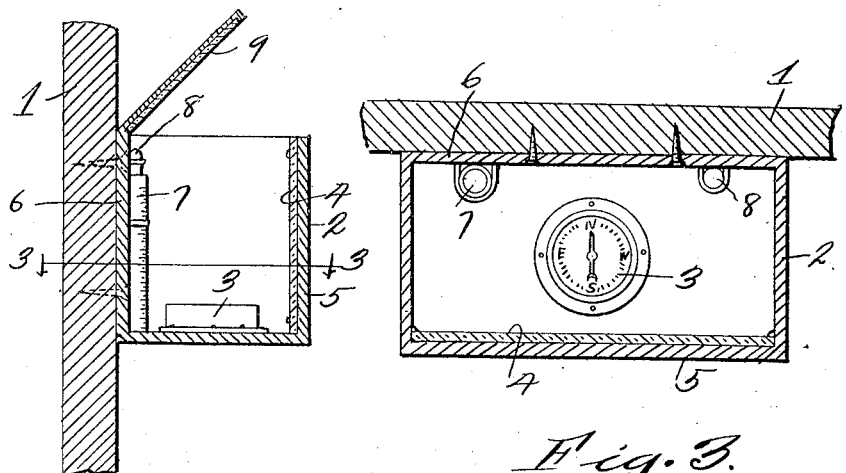
Figure 2 is a vertical transverse sectional view taken on line 2—2 of Figure 1.
Figure 3 is a horizontal sectional view taken on line 3—3 of Figure 2.

Referring to the drawing the numeral 1 designates the instrument board of a conventional form of automobile, and 2 the reflecting box carried thereby. Secured in the bottom of the box 2 is a conventional form of compass 3, which compass is horizontally disposed, with its face upwardly in a position where the dial thereof will be reflected in the vertically disposed mirror 4, carried by the wall 5 of the box. Secured to the wall 6 of the box adjacent the instrument board 1 is a vertically disposed barometer 7 and a vertically disposed thermometer 8. It will be seen that the barometer 7 and thermometer 8 will be reflected in the mirror 4, and the images will in turn be reflected upwardly into the angularly disposed mirror 9 where they will be in plain view of the operator of the automobile, thereby allowing the operator to read the barometer, thermometer and compass without leaving his position at the steering wheel. The barometer, thermometer and compass are in different positions, consequently their images will not register in the reflecting mirrors 4 and 9, therefore the operator can easily read the separate instruments without confusion. The mirrors 9 and 4 are preferably disposed at acute angles to each other as shown in Figure 2, however it is to be understood that they may be at other angles in relation to each other.

From the above it will be seen that a reflecting box is provided for thermometers, barometers and compasses, which is particularly adapted for use in connection with automobiles. It will also be seen that the device may be easily and quickly attached to an instrument board of an automobile without varying the construction thereof.

The invention having been set forth what is claimed as new and useful is:—

The combination with the instrument board of an automobile, of a reflecting box carried thereby, said reflecting box having disposed in the bottom thereof, and substantially centrally thereof a compass, a barometer carried in the rear wall of the box and disposed therein, a thermometer disposed within the box and secured to the rear wall thereof, a mirror vertically disposed and carried by the inner side of the forward wall of the box, and an angularly disposed reflecting mirror carried by the upper end of the box at an acute angle to the first mentioned mirror and positioned whereby images of the thermometer, barometer and compass will be reflected therein from the vertically disposed mirror and out of registration with each other.

In testimony whereof I hereunto affix my signature.

FRANK J. DONAHUE.